United States Patent [19]

Muranaga

[11] 4,449,123

[45] May 15, 1984

[54] DOT MATRIX TYPE MULTI-LAYER LIQUID CRYSTAL DISPLAY DEVICE

[75] Inventor: Yoshinobu Muranaga, Tokyo, Japan

[73] Assignee: Casio Computer Co., Ltd., Tokyo, Japan

[21] Appl. No.: 211,745

[22] Filed: Dec. 1, 1980

[30] Foreign Application Priority Data

Dec. 14, 1979 [JP] Japan .................. 54-162598

[51] Int. Cl.³ .............................................. G09G 3/36
[52] U.S. Cl. ...................................... 340/716; 340/784;
350/334; 350/335
[58] Field of Search ............... 340/716, 784, 728, 765;
178/30; 350/330, 331, 332, 333, 334, 335

[56] References Cited

U.S. PATENT DOCUMENTS 4,052,719  10/1977  Hutt et al. ..................... 178/30
4,231,640  11/1980  Funada et al. ................ 340/716

Primary Examiner—Marshall M. Curtis
Attorney, Agent, or Firm—Frishauf, Holtz, Goodman & Woodward

[57] ABSTRACT

A dot matrix type multi-layered liquid crystal display device has at least two liquid crystal display sections. Each liquid crystal display section has a dot matrix of transparent electrodes, and the individual liquid crystal display sections are arranged in layers such that their respective dot matrices of transparent electrodes overlie one another.

8 Claims, 27 Drawing Figures

FIG. 5

|     | a | b | c | d | e |
|-----|---|---|---|---|---|
| D1  |   |   |   |   |   |
| D2  |   | ○ | ○ |   |   |
| D3  |   |   |   |   |   |
| D4  |   |   |   | ○ |   |
| D5  |   |   | ○ | ○ |   |
| D6  |   | ○ |   |   |   |
| D7  |   |   |   |   |   |

FIG. 6

|      | a' | b' | c' | d' |
|------|----|----|----|----|
| D'1  |    |    |    |    |
| D'2  | ○  |    | ○  | ○  |
| D'3  | ○  |    | ○  | ○  |
| D'4  | ○  |    | ○  |    |
| D'5  | ○  | ○  |    | ○  |
| D'6  |    |    |    |    |

DOT MATRIX TYPE MULTI-LAYER LIQUID CRYSTAL DISPLAY DEVICE

BACKGROUND OF THE INVENTION

This invention relates to dot matrix type liquid crystal display devices having at least two liquid crystal layers.

Recently, small-sized electronic computers, which can display numerical data and also alphabetic and other characters with a liquid crystal display means having a liquid crystal layer constituting display electrodes arranged in the form of a dot matrix, have been developed and put to practical use. Such liquid crystal display means or devices, however, are limited in size in that they are assembled in small-sized electronic computers and that there are peculiar problems in determining their shape and size and also in the wiring of their electrodes, so that the number of dots used are limited. With a limited number of dots, for instances 5×7 dots for one character bit, it is difficult or impossible to display complicated characters such as small alphabet letters and Japanese characters.

This invention has been developed in view of the above drawbacks, and it has for its object to provide a dot matrix type liquid crystal display device, which uses at least two liquid crystal display sections layered on each other and permits high density display by simultaneously driving the layered liquid crystal sections.

SUMMARY OF THE INVENTION

To achieve the above object, the liquid crystal display device according to the invention comprises a liquid crystal unit including at least two liquid crystal display sections each having a liquid crystal sandwiched between two transparent base plates, and transparent electrodes arranged in the form of a dot matrix provided between the transparent base plate of each of the liquid crystal display sections. The liquid crystal display sections are arranged one above another such that the transparent electrodes in the dot matrix of each liquid crystal display sections do not overlap the transparent electrodes in the dot matrix of the other liquid crystal display sections.

With the liquid crystal display device according to the invention, with which a character is displayed with simultaneous driving of at least two liquid crystal display sections each having a liquid crystal, it is possible to obtain a display of a high density compared to that obtainable with the prior-art liquid crystal display device having only a single liquid crystal layer. Thus, complicated characters and symbols such as small alphabet letters and Japanese characters can be display in a natural form.

BRIEF DESCRIPTION OF THE DRAWINGS

FIG. 5 is a view showing the relation of common signals and segment signals coupled to the upper layer liquid crystal display section when displaying the character "a";

FIG. 6 is a view showing the relation among common signals and segment signals coupled to the lower layer liquid crystal display section when displaying the character "a";

DETAILED DESCRIPTION

Figure 1:
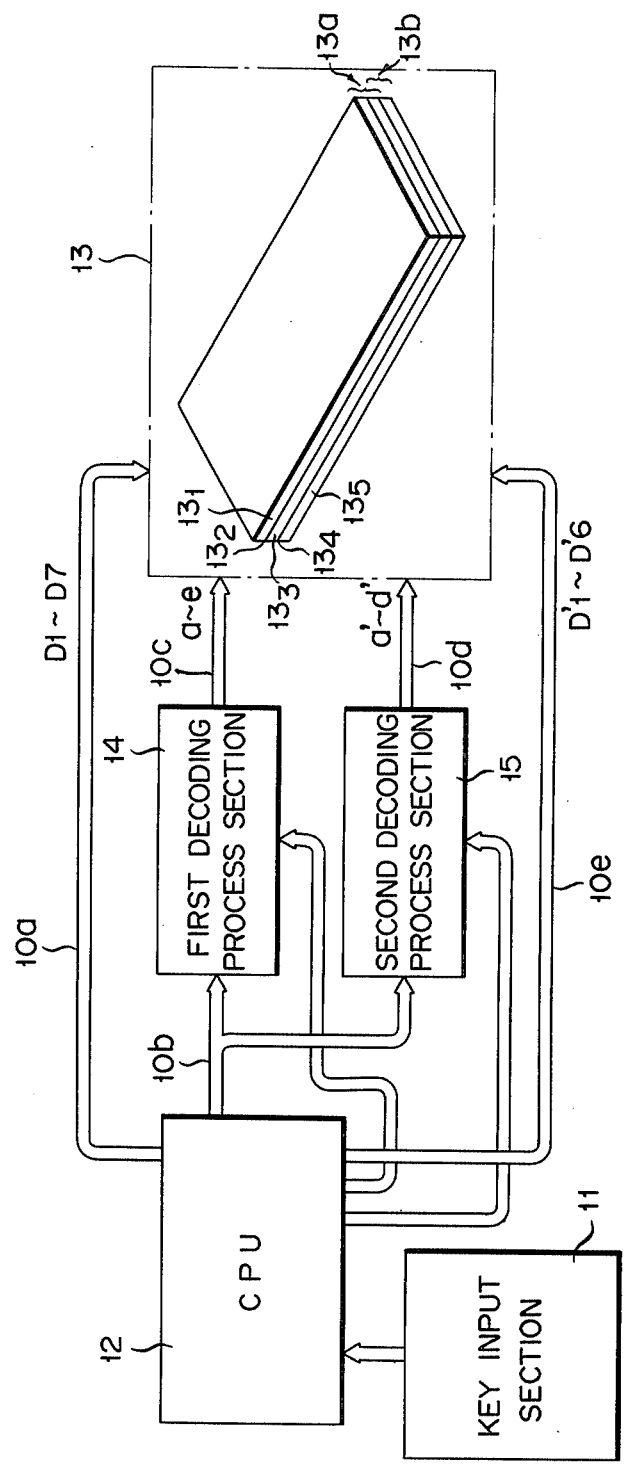
FIG. 1 is a schematic representation of whole circuit construction of the device embodying the invention.

Referring now to FIG. 1, designated at 11 is a key input or keying section having keys such as function keys, ten keys and alphabet keys for inputting character data. The numeral and character data from the keying section 11 are coupled to a CPU (central processing unit) 12 for arithmetic and other operations. The numeral data or character data coupled from the keying section 11 or data of the result of operations therein are fed to a liquid crystal display unit 13. The liquid crystal display unit 13 includes an upper layer liquid crystal display section 13a constituted by a transparent base plate $13_1$, an upper liquid crystal layer $13_2$ and a transparent base plate $13_3$; and a lower layer liquid crystal display section 13b constituted by transparent base plate $13_3$, a lower layer liquid crystal layer $13_4$ and a transparent base plate $13_5$. Common signals $D_1$ to $D_7$ for driving the upper layer liquid crystal display section 13a are supplied through a data bus 10a to the display section 13a, and segment signals for driving the upper and lower layer liquid crystal display sections 13a and 13b are supplied through a data bus 10b to first and second decoding sections 14 and 15. In addition to the segment signals coupled from the CPU 12 through the data bus 10b, timing signals produced from the CPU 12 are then fed to the first decoding section 14, and segment signals a to e for driving the upper layer liquid crystal display section 13a are coupled thereto through a data bus 10c. Also, in addition to the segment signals coupled from the CPU 12 through the data bus 10b, timing signals are fed to the second decoding section 15, and segment signals a' to d' for driving the lower layer liquid crystal display section 13b are coupled thereto through a data bus 10d. Further, common signals $D_1'$ to $D_6'$ for driving the lower layer liquid crystal display section 13 are supplied thereto through a data bus 10e.

Figure 2:
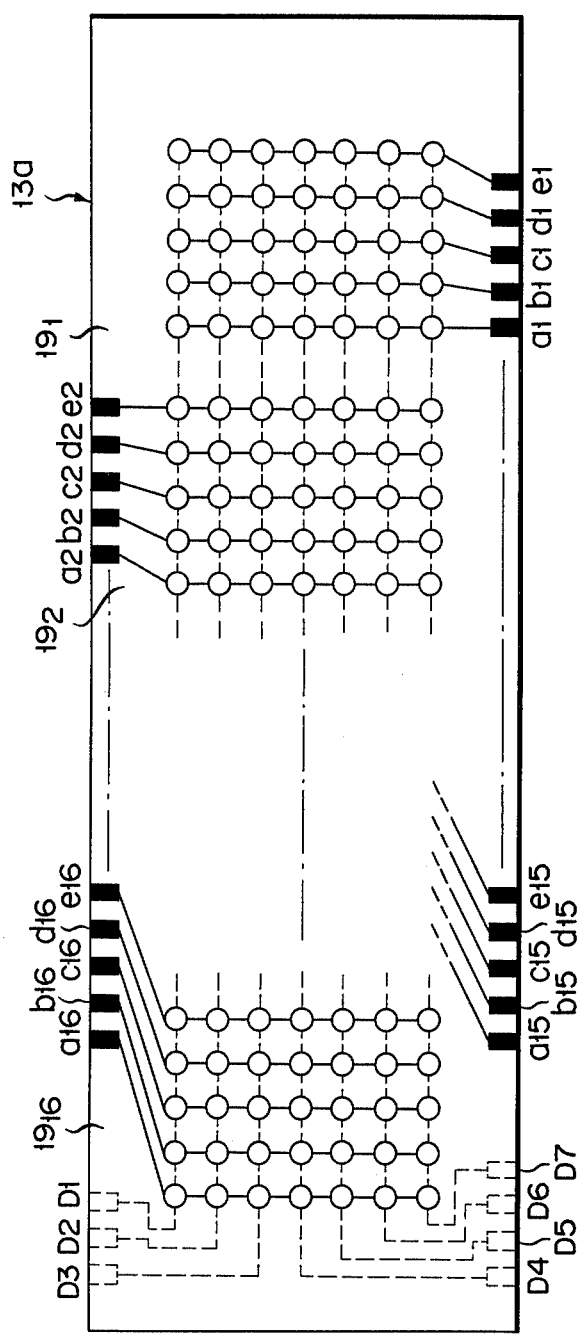
FIG. 2 is a view showing the wiring of electrodes in an upper layer liquid crystal display section.

FIG. 2 shows the electrode arrangement of the upper layer liquid crystal display section 13a in detail. Dot matrices $19_1$ to $19_{16}$ each of 5×7 dots are provided between the lower surface of the transparent base plate $13_1$ and the upper surface of the transparent base plate $13_3$ so that 16 bits of characters can be displayed. In this liquid crystal display section 13a, input terminals $D_1$ to $D_7$ for the respective common signals $D_1$ to $D_7$ are provided on the upper surface of the transparent base plate $13_3$ (as shown by dashed lines), and also input terminals $a_1$ to $e_1$, $a_2$ to $e_2$, ..., $a_{16}$ to $e_{16}$ for the respective segment signals $a_1$ to $e_1$, $a_2$ to $e_2$, ..., $a_{16}$ to $e_{16}$ are provided on the lower surface of the transparent base plate $13_1$ (as shown by solid lines).

Figure 3:
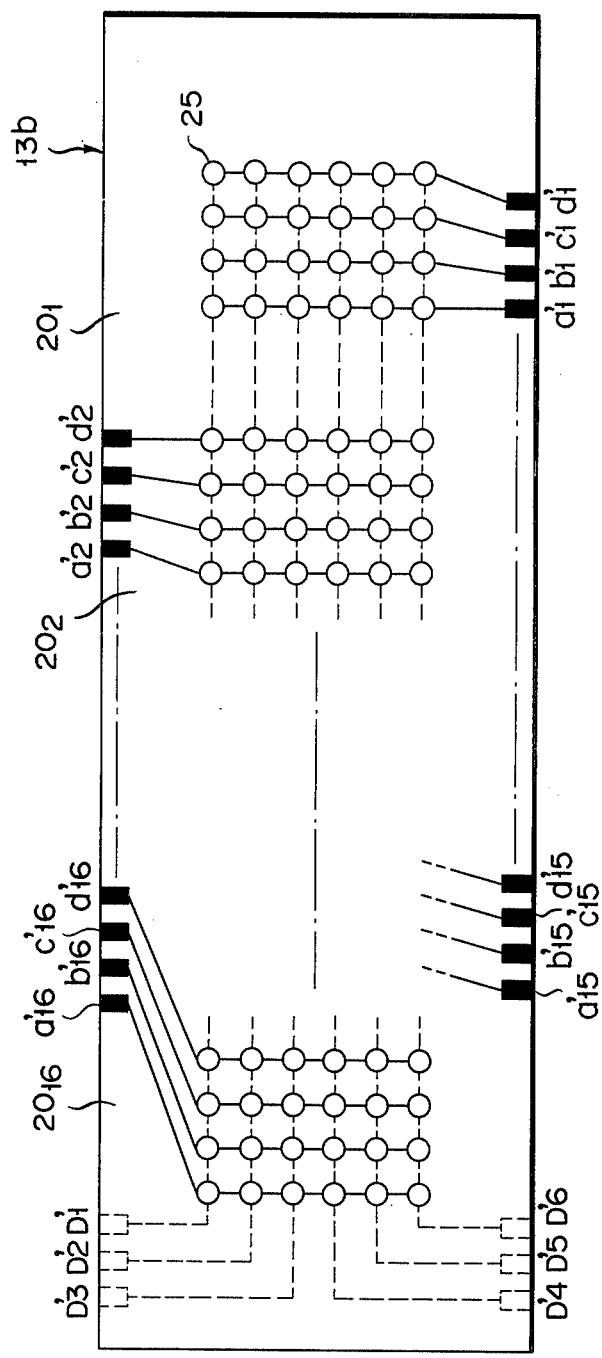
FIG. 3 is a view showing the wiring of electrodes in a lower layer liquid crystal display section.

FIG. 3 shows the electrode arrangement of the lower layer liquid crystal display section 13b in detail. Dot matrices $20_1$ to $20_{16}$ each of 4×6 dots are formed between the lower surface of the transparent base plate $13_3$ and the upper surface of the transparent base plate $13_5$ so that 16 bits of characters can be displayed. In this liquid crystal display section 13b, input terminals $D_1'$ to $D_6'$ for the respective common signals $D_1'$ to $D_6'$ are provided on the upper surface of the transparent base plate $13_5$ (as shown by dashed lines), and input terminals $a_1'$ to $d_1'$, $a_2'$ to $d_2'$, ..., $a_{16}'$ to $d_{16}'$ are provided on the lower surface of the transparent base plate $13_5$ (as shown by solid lines).

Figure 4:
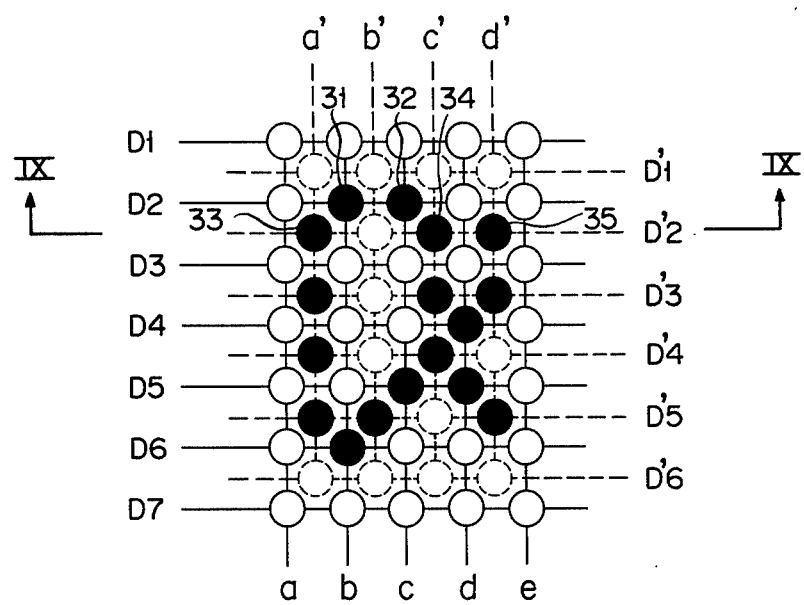
FIG. 4 is a view showing the state of display of a character "a" as one bit of the liquid crystal display unit.
Figure 9:
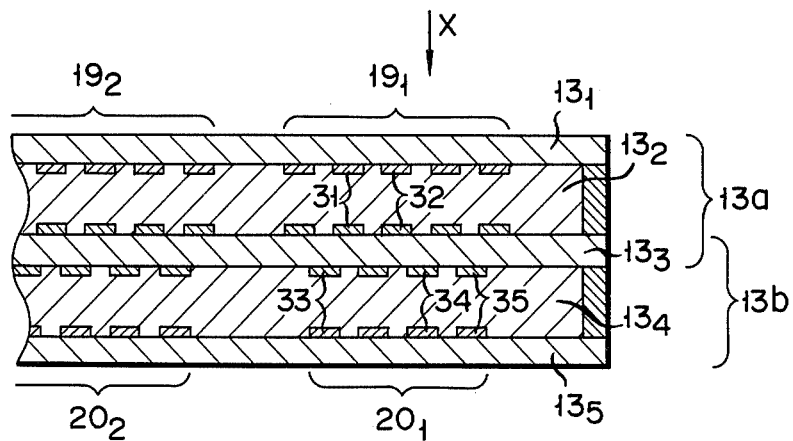
FIG. 9 is a sectional view along line IX—IX in FIG. 4.
Figure 10:
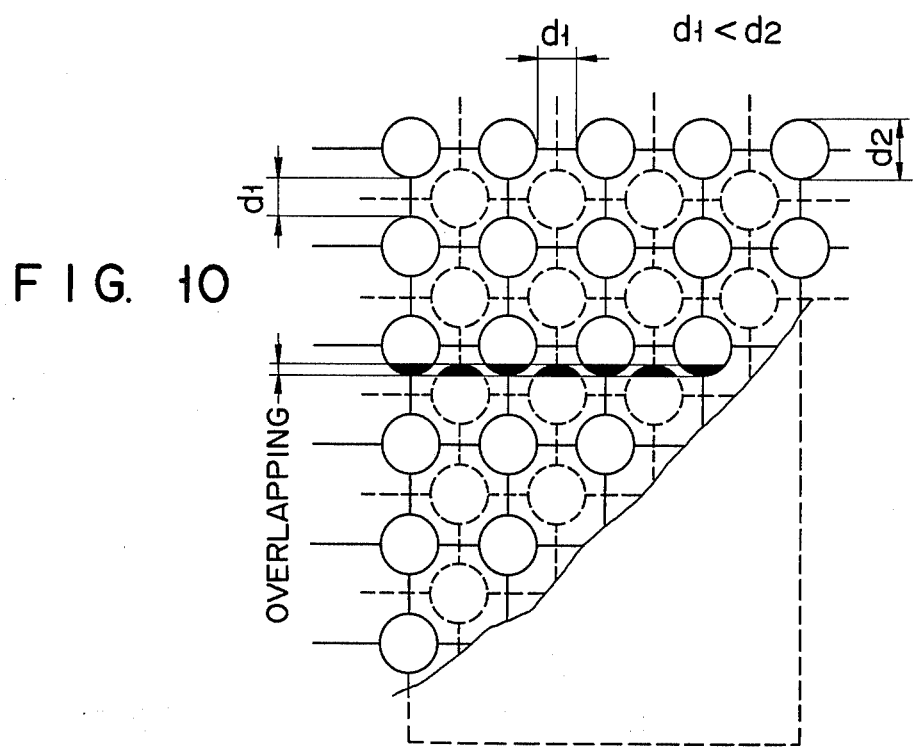
FIG. 10 is an enlarged view showing a dot arrangement.

As shown in FIG. 4, the matrices $19_1$ to $19_{16}$ of the upper layer liquid crystal display section 13a each overlie each of the matrices $20_1$ to $20_{16}$ of the lower layer liquid crystal display section 13b (only one bit being shown) such that the transparent electrodes forming the dots of each latter matrix do not overlap but are staggered with respect to the transparent electrodes forming the dots of the corresponding latter matrix. More specifically, the dots are each found at the center of a square with the corners thereof occupied by respective dots of the corresponding latter matrix. In FIG. 4, the dots in the upper layer liquid crystal display section 13a are shown by solid lines, while those in the lower layer liquid crystal display section 13b are shown by dashed lines. FIG. 9 is a cross-sectional view, as taken along line IX—IX in FIG. 4, showing a liquid crystal display unit 13. FIG. 10 is an enlarged view showing a dot arrangement of a dot matrix. The dots in the liquid crystal display means are arranged in a matrix array as shown in FIG. 10. The respective dots are arranged such that a spacing $d_1$ therebetween is smaller than a maximum width $d_2$ (the diameter) of the respective dots. The dots in the liquid crystal display means 13b are arranged in the matrix array such that they are individually located in a spacing between the respective dots in the liquid crystal display means 13a. That is, the dots of the liquid crystal display means 13a are arranged such that the respective dot is surrounded by four dots in the liquid crystal display means 13b. The dots in each liquid crystal display means have an equal or a substantially equal size. As shown in FIG. 10, the dots of a matrix row (or column) in the liquid crystal display means 13a are arranged closer to the dots of a matrix row (or column) in the liquid crystal display means 13b such that the dots in the display means 13a project into the horizontal and vertical interstices between the dots of the display means 13b, as indicated by solid black in FIG. 10, when they are viewed in a horizontal direction. In the liquid crystal display unit 13 of this construction, the segment signals a to e and a' to d' are coupled to the segment electrodes of the individual columns, and the common signals $D_1$ to $D_7$ and $D_1'$ to $D_6'$ are coupled to the common electrodes of the individual common electrodes.

The bit shown in FIG. 4 is in its state of display of a character "α", with the driven dots being shown as black dots. The dots 31 and 32, for instance, are driven as shown when the segment signals b and c are supplied at the timing of the common signal $D_2$ supplied to the upper liquid crystal display section 13a. Likewise, the dots 33, 34 and 35 are driven as shown by the respective segment signals a', c' and d' being supplied with the timing of the common signal $D_2'$.

FIG. 5 shows the correlation of the common signals $D_1$ to $D_7$ and segment signals a to e coupled to the upper layer liquid crystal display section 13a when displaying the character "α" on a given bit of the liquid crystal display unit 13 as shown in FIG. 4. The common signals $D_1$ to $D_7$ are shown as respective row elements of the matrix, and the segment signals a to e are shown as respective column elements. It is shown in FIG. 5 that for driving, for instance, the dots 31 and 32 shown in FIG. 4, the common signal $D_2$ is coupled to the row while the segment signals b and c are coupled to the respective columns b and c, as shown by circles. FIG. 6 shows the "on" or "off" states of the common signals $D_1'$ and $D_6'$ and segment signals a' to d' coupled to the lower layer liquid crystal display section 13b of the liquid crystal display unit 13, with the common signals $D_1'$ to $D_6'$ being shown as respective row elements of the matrix and the segment signals a' to d' as respective column elements. For driving, for instance, the dots 33, 34 and 35 shown in FIG. 4, the common signal $D_2'$ is coupled to the row $D_2'$ while the segment signals a', c' and d' are coupled to the respective column elements a', c' and d', as shown by respective circles.

Figure 7:
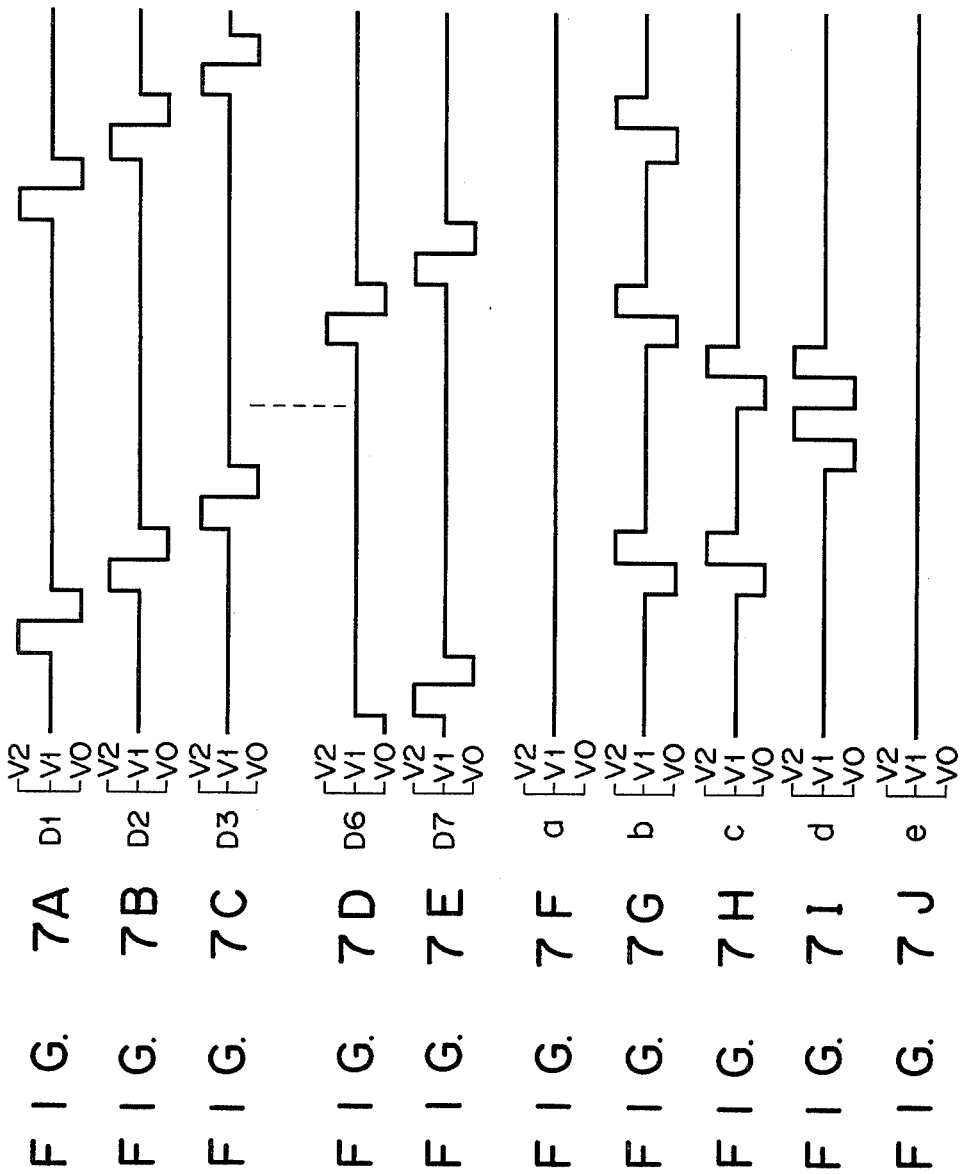
FIGS. 7A to 7J constitute signals $D_1$ to $D_7$ and also a time chart of segment signals a to e.
Figure 8:
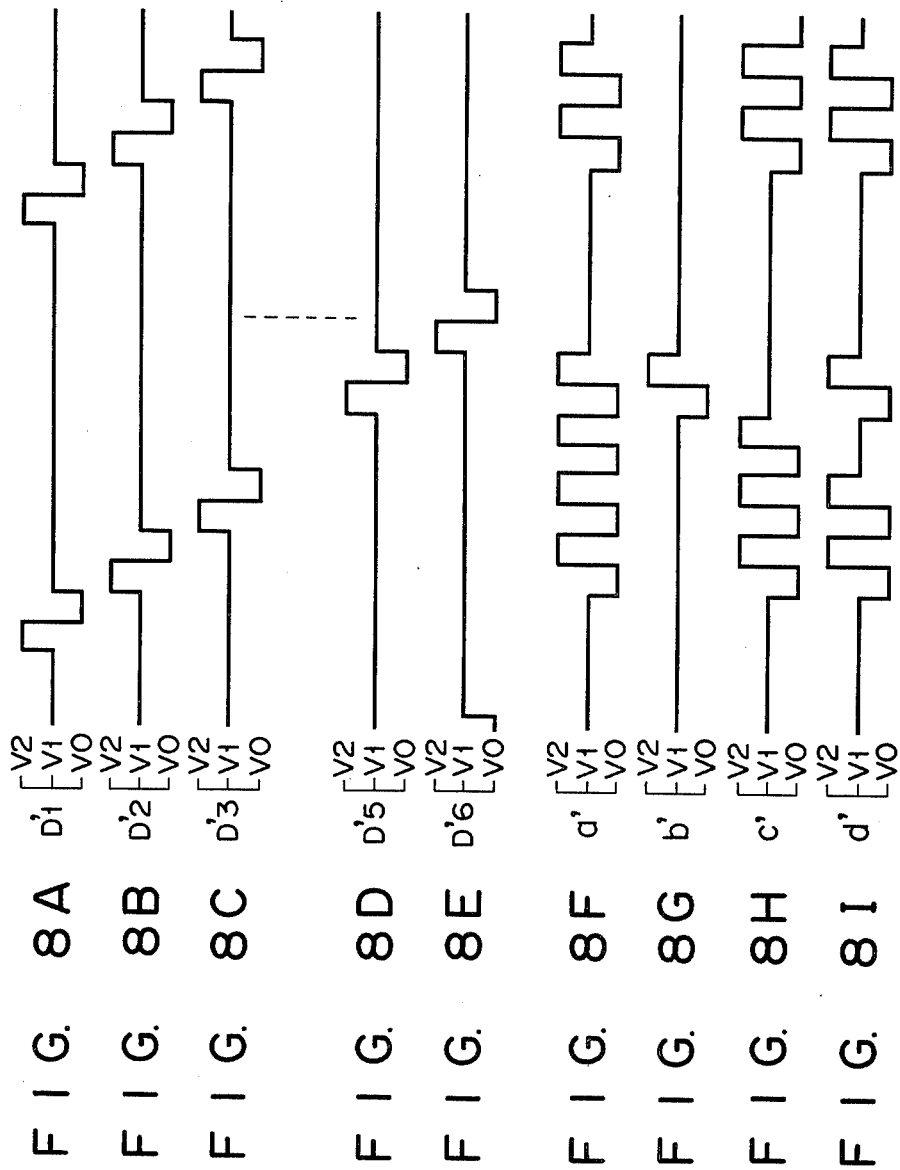
FIGS. 8A to 8E show respectively time charts of common signals $D_1'$ to $D_6'$.
FIGS. 8F to 8I show time charts of segment signals a' to d'.

FIGS. 7A to 7E show the common signals $D_1$ to $D_7$ fed to the upper layer liquid crystal display section 13a, and FIGS. 7F to 7J show the segment signals a to e coupled to the display section 13a when displaying the character "α" as a given bit on the liquid crystal display unit 13. The common signals $D_1$ to $D_7$ are timing signals having the same constant period but different in phase. When a given segment signal among the signals a to e are supplied with the timing of a given common signal, a corresponding dot is driven with that timing. For example, with the segment signals b and c, as shown in FIGS. 7G and 7H, supplied with the timing of the common signal $D_2$, as shown in FIG. 7B, the dots 31 and 32 shown in FIG. 4 are driven. FIGS. 8A to 8E show the common signals $D_1'$ to $D_6'$ fed to the lower layer liquid crystal display section 13b, and FIGS. 8F to 8J the segment signals a' to d' coupled to the display section 13b. The common signals $D_1$ to $D_7$, like the common signals $D_1'$ to $D_6'$, are timing signals different in phase, more particularly $D_1'=D_1$, $D_2'=D_2$, ..., $D_6'=D_6$. When a given segment signal among the signals a to e is supplied with the timing of a given common signal, a corresponding dot is driven with that timing. For example, with the segment signals a', c' and d', as shown in FIGS. 8F, 8H and 8I, supplied with the timing of the common signal $D_2'$, as shown in FIG. 8B, the dots 33, 34 and 35 are driven as shown in FIG. 4.

The operation of the above construction according to the invention will now be described. When character data, for instance for character "α", memorized in the CPU 12 is fed through the data bus 10b to the first and second decoding sections 14 and 15 according to an output from the keying section 11, the segment signals a to e, as shown in FIGS. 7F to 7J, for driving the upper layer liquid crystal display section 13a are coupled to the input terminals, for instance input terminals $a_1$ to $e_1$, of the liquid crystal display unit 13. Also, the segment signals a' to d', as shown in FIG. 8F to 8J, for driving the lower layer liquid crystal display section 13b are coupled to the input terminals, for instance input terminals $a_1'$ to $d_1'$ of the display unit 13. Further, the common signals $D_1$ to $D_7$, as shown in FIGS. 7A to 7E, for driving the upper layer liquid crystal display section 13a are coupled through the data bus 10a to the input terminals $D_1$ to $D_7$ of the liquid crystal display unit 13, and the common signals $D_1'$ to $D_6'$, as shown in FIGS. 8A to 8E, for driving the lower layer liquid crystal display section 13b are coupled through the data bus 10e to the display unit 13. The common signals D₁ to D₇ and segment signals a to e have the respective timings as shown in FIGS. 7A to 7J and drive the specified dots. Also, the common signals $D_1'$ to $D_6'$ and segment signals a' to d' have respective timings as shown in FIGS. 8A to 8I and drive the specified dots. As a result, the specified dots of the upper and lower layer liquid crystal display sections 13a and 13b are driven as shown in FIGS. 5A and 5B. Since the upper and lower layer liquid crystal display sections 13a and 13b overlie each other, the resultant display is as shown in FIG. 4. In the above way, the character "α" coupled from the keying section 11 is displayed by the combination of the upper and lower layer liquid crystal display sections 13a and 13b of the liquid crystal display unit 13.

The shape of the dots is not limited to the round shape as shown but may also be a square or any other desired shape.

Also, while in the arrangement shown in FIGS. 2 and 3 the input terminals for the individual bits are provided on the alternate upper and lower edges of the unit, it is also possible to provide the input terminals for the individual columns on the alternate upper and lower edges. In general, there is no limitation on the way of providing the input terminals.

What is claimed is:

1. A dot matrix type multi-layer liquid crystal display device comprising:
    a liquid crystal display unit including at least two liquid crystal display sections, each liquid crystal display section including a liquid crystal sandwiched between two transparent base plates, and transparent electrodes arranged in the form of a dot matrix pattern, said transparent electrodes being provided on a transparent base plate, said dot matrix patterns of each liquid crystal display section having a plurality of rows and columns of dots, said rows and columns extending horizontally and vertically, respectively, in the plane of the respective display section;
    means for arranging said liquid crystal display sections one above another such that the transparent electrodes of one liquid crystal display section are disposed without overlapping the transparent electrodes of the other liquid crystal display section when viewing in the vertical diection with respect to said transparent base plates, and said transparent electrodes of said one liquid display section projecting into the horizontal and vertical interstices between the transparent electrodes of the other liquid crystal display section when viewing in the horizontal direction with respect to said transparent base plates;
    means for supplying a common drive signal to the transparent electrodes of one of said crystal display sections; and
    at least two decoding means coupled respectively to the liquid crystal display sections, said decoding means each decoding input data representing a character, a numeral of a symbol in synchronism with said common drive signal and supplying segment drive signals to the transparent electrodes of the respective liquid crystal display sections.

2. A dot matrix type multi-layer liquid crystal display device according to claim 1, wherein adjacent liquid crystal display sections of said liquid crystal display unit include a common transparent base plate, said common base plate constituting both the lower transparent base plate of an upper liquid crystal display means and the upper transparent base plate of a lower liquid crystal display means.

3. A dot matrix type multi-layer liquid crystal display device according to claim 2, wherein transparent electrodes in the form of dot matrices are provided on both sides of said common transparent base plate such that the transparent electrodes on the upper side thereof do not coincide with the transparent electrodes on the lower side thereof.

4. A dot matrix type multi-layer liquid crystal display device according to claim 1, wherein said liquid crystal display unit includes a liquid crystal display section having a 7-bit dot matrix and another liquid crystal display section having a 6-bit dot matrix.

5. A dot matrix type multi-layer liquid crystal display device according to claim 1, wherein each of said liquid crystal display sections has common terminals for the individual transparent electrode columns of said dot matrix, said common terminals being provided along alternate upper and lower edges of said liquid crystal display section.

6. A dot matrix type multi-layer liquid crystal display device according to claim 1, further comprising means for simultaneously driving all of said liquid crystal display sections.

7. A dot matrix type multi-layer liquid crystal display device according to claim 1, wherein said transparent electrodes are disc-shaped.

8. A dot matrix type multi-layer liquid crystal display device comprising:
    a liquid crystal display unit including first and second liquid crystal display means (13a, 13b) each having a liquid crystal ($13_2$, $13_4$) sandwiched between two transparent base plates ($13_1$, $13_3$ and $13_3$, $13_5$), transparent electrodes ($19_1$–$19_{16}$, $20_1$–$20_{16}$) arranged in the form of a dot matrix and provided between the transparent base plates ($13_1$, $13_3$ and $13_3$, and $13_5$), the spacing between the respective transparent electrodes ($19_1$–$19_{16}$) in a first (13a) of said liquid crystal display means (13a, 13b) being less than the maximum width of the respective dots of the transparent electrodes ($19_1$–$19_{16}$), the second liquid crystal display means (13b) being in an overlapping relation to the first liquid crystal display means (13a), and said transparent electrodes ($20_1$ to $20_{16}$) in the second liquid crystal display means (13b) being arranged between the respective transparent electrodes ($19_1$–$19_{16}$) of the first liquid crystal display means (13a) such that they are in a non-overlapping relation to the transparent electrodes ($19_1$–$19_{16}$) of the first liquid crystal display means (13a);
    means (12) for supplying common signals to the transparent electrodes ($19_1$–$19_{16}$ and $20_1$–$20_{16}$) in the first and second liquid crystal display means (13a, 13b); and
    at least two decoding means (14, 15) provided respectively for the first and second liquid crystal display means (13a, 13b), said decoding means (14, 15) decoding input data representing one character, a numeral or a symbol in synchronism with the common signals and supplying segment signals to the transparent electrodes of the first and second liquid crystal display means (13a, 13b).

* * * * *

UNITED STATES PATENT AND TRADEMARK OFFICE
CERTIFICATE OF CORRECTION

PATENT NO.    :    4,449,123
DATED         :    Yoshinobu MURANAGA
INVENTOR(S)   :    May 15, 1984

It is certified that error appears in the above-identified patent and that said Letters Patent is hereby corrected as shown below:

Column 5, line 61 (claim 1), after "numeral", change "of" to --or--;

Column 1, lines 43 and 45, the word "sections" (in each instance) should read --section--.

Signed and Sealed this

Twenty-sixth Day of February 1985

[SEAL]

Attest:

DONALD J. QUIGG

Attesting Officer    Acting Commissioner of Patents and Trademarks